Dec. 21, 1926.

A. WICKEY 1,611,297

MACHINE FOR MIXING CONCRETE OR THE LIKE

Filed Oct. 6, 1925

Inventor
ANDREW WICKEY,
Attorney

Patented Dec. 21, 1926.

1,611,297

UNITED STATES PATENT OFFICE.

ANDREW WICKEY, OF EAST CHICAGO, INDIANA.

MACHINE FOR MIXING CONCRETE OR THE LIKE.

Application filed October 6, 1925. Serial No. 60,897.

My invention relates to a machine for mixing concrete, mortar or the like.

An important object of the invention is to provide a machine of the above mentioned character, which is adapted to effect a thorough mixing or working of the material, and to discharge the mixed product in a continuous manner.

An important object of the invention is to provide a machine of the above mentioned character, so constructed that the thorough mixing of the material is accomplished partly by the action of gravity upon such material.

A further object of the invention is to provide a machine of the above mentioned character, operating continuously, and first thoroughly mixing the solid materials in the dry state, and subsequently applying water thereto, and again mixing thoroughly, and discharging the final product.

Other objects and advantages of my invention will be apparent during the course of the following description.

Figure 1:
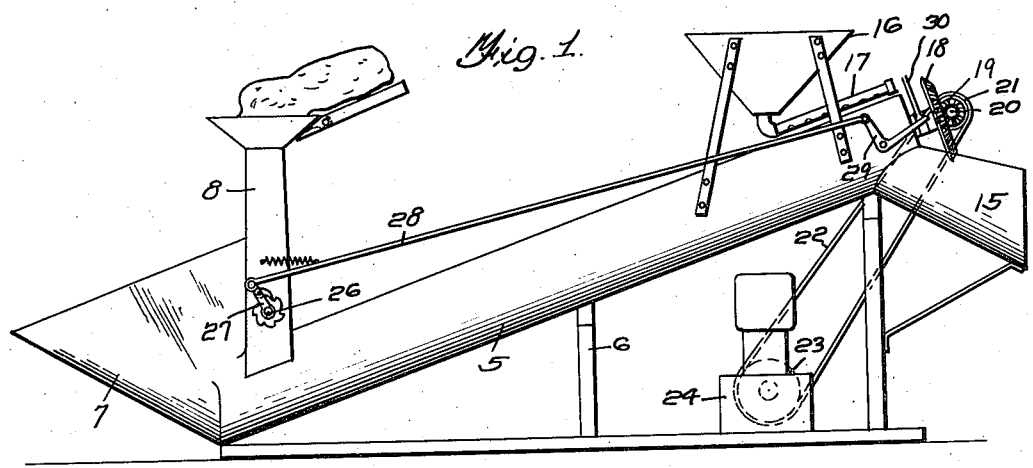
Figure 2:
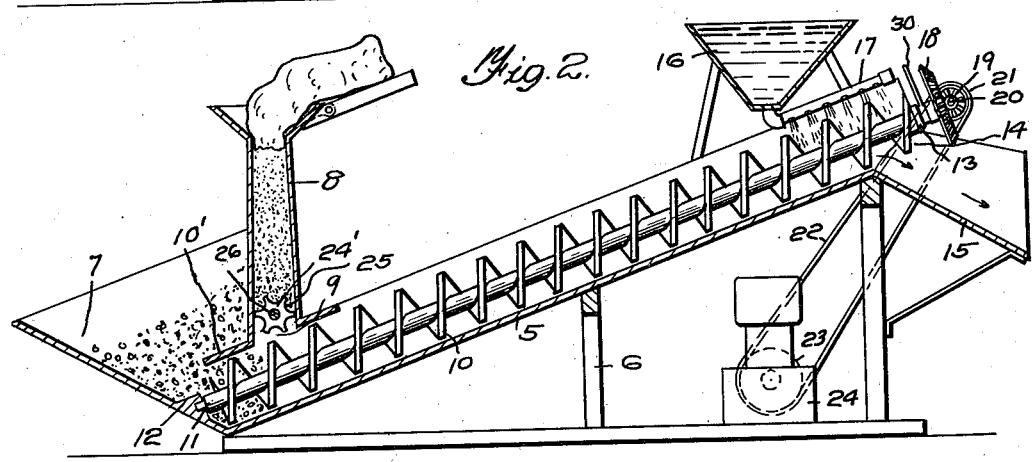
Figures 3, 4:
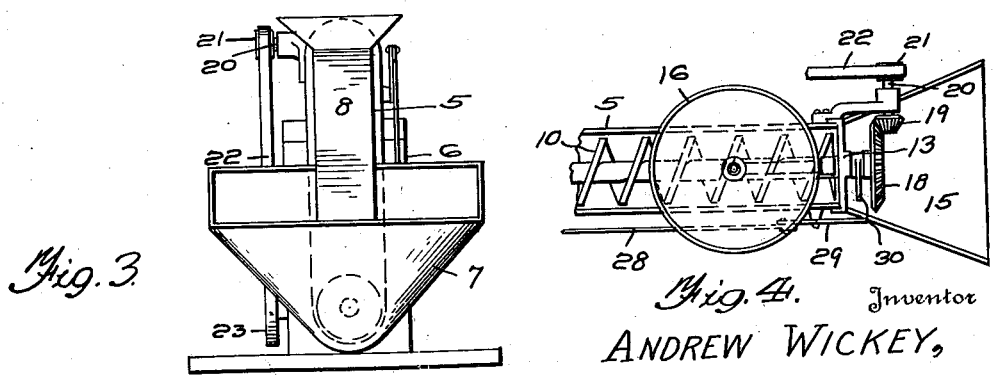

In the accompanying drawings forming a part of this specification and in which like numerals are employed to designate like parts throughout the same, Figure 1 is a side elevation of a mixing machine embodying my invention, Figure 2 is a central vertical longitudinal section through the machine, and, Figure 3 is an end elevation of the same.

Figure 4 is a plan view of the discharge end of my invention.

In the drawings, wherein for the purpose of illustration, is shown a preferred embodiment of my invention, the numeral 5 designates a mixing casing or trough, which is circular in cross section, as more clearly shown in Figure 4. The casing or trough 5 is stationary and is supported by any suitable means, such as uprights 6. The casing or trough 5 is inclined with respect of the horizontal, and extends upwardly toward its discharge end.

Rigidly attached to the lower intake end of the casing or trough 5 is a sand and gravel hopper 7 flaring upwardly. Arranged in advance of this hopper 7 is a cement hopper 8, which leads into the casing or trough 5, at a point adjacent to and in advance of the hopper 7. This hopper has a flaring mouth 9. The hopper 8 may be rigidly attached to the hopper 7 and to the lower end of the trough or casing 5.

Arranged within the casing or trough 5 is a feeding and mixing spiral or screw conveyer 10, which extends throughout the entire length of the casing or trough 5, and projects into the hopper 7 and extends beneath the hopper 8. A guard or apron 10' is arranged in the hopper 7 and covers the top of the intake end of the spiral conveyer, whereby the material is made to enter the casing 5 at the end of the conveyer, thereby preventing choking of the same. This spiral conveyer is mounted upon and driven by a longitudinal shaft 11, the lower end of it is mounted within an end-thrust bearing 12, rigidly attached to the interior of the hopper 7. The upper end of this shaft is journaled through a bearing 13, which is attached to the upper discharge end of the casing or trough 5, as shown.

The upper discharge end of the casing or trough 5 is provided in its bottom with a discharge opening 14, leading into a discharge chute 15, adapted to convey the mixed material to a desired point.

The numeral 16 designates a water tank, arranged above the upper discharge end of the trough or casing 5, and having connection at its bottom with an outlet pipe 17, which extends longitudinally of the top of the casing or trough 5, for a suitable distance. The outlet pipe 17 is apertured and is preferably disposed in alinement with the central longitudinal axis of the spiral conveyer. The purpose of the pipe 17 is to supply water to the previously mixed dry materials, whereby the wet mass is completely mixed prior to being discharged from the casing or trough 5.

The shaft 11 may be driven by any suitable means and as illustrative of one form of driving means I have shown a beveled gear 18 rigidly mounted thereon, and this beveled gear is driven by a second beveled gear 19, carried by a transverse shaft 20. This shaft 20 is driven by a pulley 21, engaged by a belt 22, engaging the pulley 23, of a prime mover, such as an internal combustion engine 24.

A rotary feed valve 24 is mounted in the bottom of the cement hopper 8 and has pockets 25, for holding selected amounts of cement, which are intermittently fed to the casing 5. This feed valve 24 is rigidly mounted upon a transverse shaft 26, carrying a crank 27, having a pawl and rachet connection therewith, to turn the feed valve in one direction. This crank 27 has connection with a link 28, extending longitudinally of the casing 5 and pivoted to a pivoted bell-crank lever, disposed in the path of travel of a radial arm 30, rigidly mounted upon the shaft 11, to rotate therewith. The feed-valve is therefore advanced one step, to dump the succeeding pocket, when the shaft 11 has made one revolution.

The operation of the machine is as follows:

When concrete is being mixed, the sand and gravel are introduced into the hopper 7, while the cement is introduced into the hopper 8. This cement is fed to the casing intermittently in proper amounts, to combine with the mass of sand and gravel. The spiral conveyer 10 is continuously rotated in the direction to effect the upward longitudinal travel of the material. The lower end of the spiral conveyer by projecting into the hopper 7 effects a mixture of the sand and gravel, to some extent, before such mixture reaches the cement, subsequently to which a further mixing occurs. The solid materials of the mix are thoroughly mixed by the action of the inclined spiral conveyer, and this thorough mixing is aided by the action of gravity upon the material, tending to retard its upper travel. The dry solid materials are carried upwardly throughout the major portion of the length of the casing or trough, without being subjected to the action of the water. I have found by practical tests that if the mass is rendered wet at or near the lower end of the inclined casing or trough, that the same cannot be properly elevated by the spiral conveyer, and that satisfactory results are not obtainable. For this reason the water is not applied to the dry mix until it approaches the upper discharge end of the casing or trough. The water is thus applied to the dry mix after the solid materials thereof have been thoroughly mixed in the dry state. The dry mix can be readily elevated or advanced by the spiral conveyer, and the water is supplied to the dry mix in ample time for the same to be properly worked prior to discharging the wet mix from the machine.

The machine is particularly well adapted for use in mixing concrete, but not necessarily restricted to this precise use, as it may be employed to mix mortar or various materials.

It is to be understood that the form of my invention herein shown and described is to be taken as a preferred embodiment of the same, and that various changes in the shape, size, and arrangement of parts, may be resorted to, without departing from the spirit of my invention or the scope of the subjoined claim.

Having thus described my invention, I claim:

A machine for mixing concrete or the like comprising a longitudinally inclined casing of substantial length and having a discharge opening near its upper end, means for feeding dry material into the lower end of the casing, a single continuous inclined spiral conveyor extending longitudinally within the inclined casing with its axis of rotation substantially parallel with the longitudinal axis of the casing, means to rotate the spiral conveyor so that it will thoroughly agitate and mix the material and feed the same toward the upper end of the casing, such material tending to gravitate toward the lower end of the casing and hence having its depth decreasing toward the upper end of the casing, and means for spraying water into the upper end of the casing only including a perforated pipe extending from a point adjacent to the discharge end and longitudinally of the casing for a considerable distance so that it covers a plurality of turns of the spiral conveyor, said pipe terminating at a point remote from the point which is equi-distantly spaced from the ends of said casing, thereby providing a water applying zone of substantial length at the upper end of the casing within which the material is subjected to the action of water in the presence of agitation, the agitation being at the maximum in this elevated water applying zone as the depth of the material is reduced, said water supply zone constituting a relatively short portion of the length of the casing, the remaining major portion of said length constituting a dry zone.

In testimony whereof I affix my signature.

ANDREW WICKEY.